US010024337B2

(12) United States Patent
Helene Junior et al.

(10) Patent No.: US 10,024,337 B2
(45) Date of Patent: Jul. 17, 2018

(54) ROTOR FOR AN EXHAUST-FAN ASSEMBLY OF AN AGRICULTURAL MACHINE

(71) Applicant: Marchesan Implementos e Maquinas Agricolas Tatu S.A., Matao (BR)

(72) Inventors: Dacio Helene Junior, Varginha (BR); Valter Palmute, Araras (BR)

(73) Assignee: Marchesan Implementos e Máquinas Agrícolas Tatu S.A., Matao-SP (BR)

( * ) Notice: Subject to any disclaimer, the term of this patent is extended or adjusted under 35 U.S.C. 154(b) by 0 days.

(21) Appl. No.: 15/324,202

(22) PCT Filed: Dec. 4, 2014

(86) PCT No.: PCT/BR2014/050030
§ 371 (c)(1),
(2) Date: Jan. 5, 2017

(87) PCT Pub. No.: WO2016/008016
PCT Pub. Date: Jan. 21, 2016

(65) Prior Publication Data
US 2017/0284414 A1    Oct. 5, 2017

(30) Foreign Application Priority Data

Jul. 14, 2014  (BR) .......................... 102014017335

(51) Int. Cl.
*F04D 29/34* (2006.01)
*F04D 29/54* (2006.01)
(Continued)

(52) U.S. Cl.
CPC ........... *F04D 29/54* (2013.01); *F04D 29/329* (2013.01); *F04D 29/34* (2013.01); *F04D 29/384* (2013.01); *A01B 76/00* (2013.01); *F04D 29/325* (2013.01)

(58) Field of Classification Search
CPC ...... F04D 19/02; F04D 29/325; F04D 29/329; F04D 29/34; F04D 29/668
See application file for complete search history.

(56) References Cited

U.S. PATENT DOCUMENTS 874,805 A     12/1907  Stine
1,807,397 A *  5/1931  Fechheimer .............. F04D 3/00
                                                415/207
(Continued)

FOREIGN PATENT DOCUMENTS

BR    PI 0302278-1    3/2005

OTHER PUBLICATIONS

Churchward, et al., "Some economic aspects of mechanical cane harvesting in Queensland", Proc. Qd Soc, Sugar Cane Technol. Thirty-Ninth Conference, 1972, pp. 31-38.
(Continued)

*Primary Examiner* — Ninh H Nguyen
(74) *Attorney, Agent, or Firm* — Alston & Bird LLP (57) ABSTRACT

One describes a rotor (1) for an exhaust-fan assembly (4) of an 5 agricultural machine, the rotor (1) comprising a central shaft (7), a first portion (31) provided with an inlet deflector (15) having a substantially elliptical profile, defining a tapered inlet end (26). The rotor, which is also provided with a set of blades (13), further comprises a second portion (29) provided with an outlet deflector (22) having a substantially elliptical profile, so that the 10 first and the second portions (31, 29) are associated to the central shaft (7). According to the invention, one provides a rotor that promotes efficient cleaning of harvested cane.

7 Claims, 8 Drawing Sheets

(51) Int. Cl.
*F04D 29/32* (2006.01)
*F04D 29/38* (2006.01)
*A01B 76/00* (2006.01)

(56) References Cited

U.S. PATENT DOCUMENTS

| | | | |
|---|---|---|---|
| 2,191,341 A * | 2/1940 | Curley | F04D 19/002 |
| | | | 415/119 |
| 2,323,456 A | 7/1943 | Curley et al. | |
| 4,155,602 A | 5/1979 | Quick | |
| 4,780,052 A | 10/1988 | Pradelle | |
| 5,803,709 A | 9/1998 | Matthews et al. | |
| 6,869,352 B2 | 3/2005 | Shefet et al. | |
| 2006/0171804 A1 | 8/2006 | Brown et al. | |
| 2012/0128494 A1* | 5/2012 | Pelley | F04D 19/002 |
| | | | 416/151 |
| 2015/0327438 A1* | 11/2015 | Cazenave | A01D 45/10 |
| | | | 56/51 |

OTHER PUBLICATIONS

International Searching Authority (ISA), International Search Report and Written Opinion (ISR/WO) for International Application No. PCT/BR2014/050030, dated Apr. 2, 2015, 9 pages, European Patent Office, Netherlands.

Applicant's Written Response to the ISR/WO for International Application No. PCT/BR2014/050030, dated Oct. 27, 2015, 5 pages.

* cited by examiner

ROTOR FOR AN EXHAUST-FAN ASSEMBLY OF AN AGRICULTURAL MACHINE

CROSS REFERENCE TO RELATED APPLICATIONS

This application is a National Stage Application, filed under 35 U.S.C. 371, of International Application No. PCT/BR2014/050030, filed Dec. 4, 2014, which claims priority to Brazilian Application No. BR102014017335-8, filed Jul. 14, 2014; the contents of both of which are hereby incorporated by reference in their entirety.

BACKGROUND

Related Field

The present invention relates to a rotor applicable to an exhaust-fan assembly of a sugar cane harvesting machine. More specifically, the present invention relates to a rotor, the structural configuration of which enables high efficiency and capability of removing impurities from the harvested sugarcane.

Description of Related Art

Agricultural machines are commonly used, for instance, in harvesting sugar-cane. In this situation, the main objective is to harvest as much sugar cane as possible and clean it efficiently.

By "cleaning the harvested cane" one understands removing the vegetable and mineral impurities that accompany the harvested cane. Usually, for cleaning the harvested cane the agricultural machine comprises an exhaust-fan assembly composed by a duct and a rotor. Such a rotor is configured for removing the impurities from the harvested cane by air suction.

The rotor comprises basically a central shaft capable of receiving mechanical power from a hydraulic engine, inlet and outlet deflectors, besides blades move according to the movement of the above-mentioned shaft.

If the rotor is badly designed, it may cause turbulence and inefficient air suction, thus generating a non-uniform distribution of the air filets throughout the engine arrangement.

In this regard, it should be mentioned that the rotor should group the air filets as uniformly as possible, so that they can pass through a smaller area of the engine than the inlet area of the exhaust-fan assembly, expelling as much impurities from the cane as possible.

Basically, the high efficiency of an engine for agricultural machines will be achieved by arranging (inlet and outlet) deflectors throughout the blades fixed to the engine, and by structural configuration of said blades.

Seeking a rotor with as high efficiency as possible, U.S. Pat. No. 4,155,602 discloses a device for removing impurities on sugar-cane harvesters, wherein the blades have straight profiles.

With regard to the arrangement of the blades, this document discloses an initial baffle whose profile, at its lower part, is formed by a truncated cone of smaller diameter, so that the smaller diameter corresponds to the upper part of the baffler, this part corresponding to the blade-fixation region (ring). On the other hand, the outlet baffle has, at its end, a diameter smaller than that of the blade-fixation region.

With regard to the arrangement of the blades, the straight profile proposed in the patent in question provides greater turbulence in the air flow, because it generates a more aggressive detachment of the air filets.

As to the geometry of the inlet and outlet deflectors, it has the drawback that the lower part of the truncated cone has a large "dead area" for the air flow, thus generating drag and barriers to the air flow.

Further, due to the abrupt changes of the profile of the truncated cone—ring—, the detachment of air is more aggressive, and may also generate high turbulence. Thus, the cleaning of the harvested cane is not carried out as desired.

On the other hand, document U.S. Pat. No. 6,869,352 discloses a cleaning chamber of an agricultural machine, wherein a hydraulic engine drives directly the element on which the blades are arranged, the hub being protected by a single-profile tube. This document does not make reference to inlet or outlet deflectors.

The above-mentioned characteristics generate a barrier to air displacement, which ends up impairing the efficiency of the cleaning chamber. Further, it becomes necessary to apply a high power for driving the blades, which implies an increase in the consumption of fuel and in the operation cost.

The prior art further presents document PI 0302278-1, in which one addresses a trash extractor arrangement on a sugar-cane harvesting machine. In the case of this extractor, the blade profile is grooved in a single direction, so that the groove has, as center line, the straight line from the bottom to the blade outlet (neutral line).

The above-mentioned profile is deficient at both the air inlet, due to the lack of attack, and at the air outlet due to the lack of trail angle.

With regard to the deflectors, both the inlet deflector and the outlet one, they have a totally spherical profile and are fixed to the blade projection region. Such a spherical profile is detrimental, since it has a large dead central area, which ends up causing a barrier to the air flow.

Further due to the spherical profile, the radial flowing of air over the deflectors is aggressive and causes turbulence, which impairs the flowing and decreases the efficiency of the whole system.

Thus, each of the configurations mentioned above in the prior-art documents has obstacles that impair an efficient cleaning of the harvested cane.

Specifically with regard to said deflectors, one observes that the arrangement thereof ends up causing high turbulence and barriers to the air flow in some cases.

This occurs because none of the rotors disclosed in the prior art comprises deflectors whose configuration is capable of grouping homogeneously the air filets that get into the exhaust-fan assembly.

More specifically, the deflectors of the rotors of agricultural machines known from the prior art do not have a tapering point (attack point) at the inlet of the air filets.

Additionally, the prior art does not disclose a rotor for agricultural machines on which the deflectors are provided with an elliptical profile, this profile favoring the suction and the displacement of air and, as a result, potentiating the cleaning of each harvested cane.

Moreover, studies carried out by Churchward and Belcher (1972), entitled "Some economic aspects of mechanical cane harvesting ion Queensland, Proc. Qd Soc, Sugar Cane Technol. $39^{th}$ Conf. 31-38", shows that each extractor assembly (exhaust-fan) of the sugar-cane harvester known from the prior art consume approximately 60 HP to carry out an efficient cleaning of the harvested cane. It should be reminded that most harvesting machines use two exhaust-fan assemblies, and the consumed power would correspond to 120 HP.

The new configuration proposed in this specification enables one to carry out the harvesting work with a single exhaust-fan assembly per machine, generating a consumption of 30 HP, saving diesel and reducing the harvesting operation cost.

BRIEF SUMMARY

The present invention has the objective of providing a rotor for an exhaust-fan assembly of an agricultural machine, the arrangement of the inlet and outlet deflectors of which enables homogeneous grouping of the air filets, providing an efficient cleaning of the harvested cane on the agricultural machine.

The present invention has also the objective of providing a rotor for an exhaust-fan assembly of an agricultural machine, wherein the inlet deflector has a point of attack that is capable of preventing barriers and the occurrence of turbulence in the air flow.

The objectives of the present invention are achieved by means of an exhaust-fan assembly of an agricultural machine, the rotor comprising a central shaft, a first portion provided with an inlet deflector having a substantially elliptical profile and defining a tapering inlet end, the rotor further comprising a second portion provided with an outlet deflector having a substantially elliptical profile, so that the first and the second portions are associated to the central shaft. Further, the proposed rotor comprises a set of blades coupled to the central shaft.

In a preferred embodiment, the rotor comprises a third portion arranged between the first portion and the second portions, the third portion being provided with a rotary hub associated to one portion of the shaft by means of a movement transfer system.

The set of blades is associated to the rotor hub and protrudes from a side surface of the hub. Each of the blades of the set is associated to the hub by means of an internal ring inside the hub and a support plate, the support plate being fixed to the ring and having a profile substantially similar to the profile of a region of the blades, the region being adjacent to the hub.

The rotor also comprises a hub protective cover, the protective cover being provided with openings for passage of the blades and support plate. An anti-vibration plate is also foreseen, arranged between each of the blades and the support plate.

In a preferred embodiment, the outlet deflector is fixed, and the inlet deflector is turnable, and a portion of the central shaft is involved by a protective tube, the outlet deflector being associated to the protection tube.

BRIEF DESCRIPTION OF THE FIGURES

The present invention will now be described in greater detail on the basis of an example of embodiment represented in the drawings. The figures show.

DETAILED DESCRIPTION OF VARIOUS EMBODIMENTS

Figure 1:
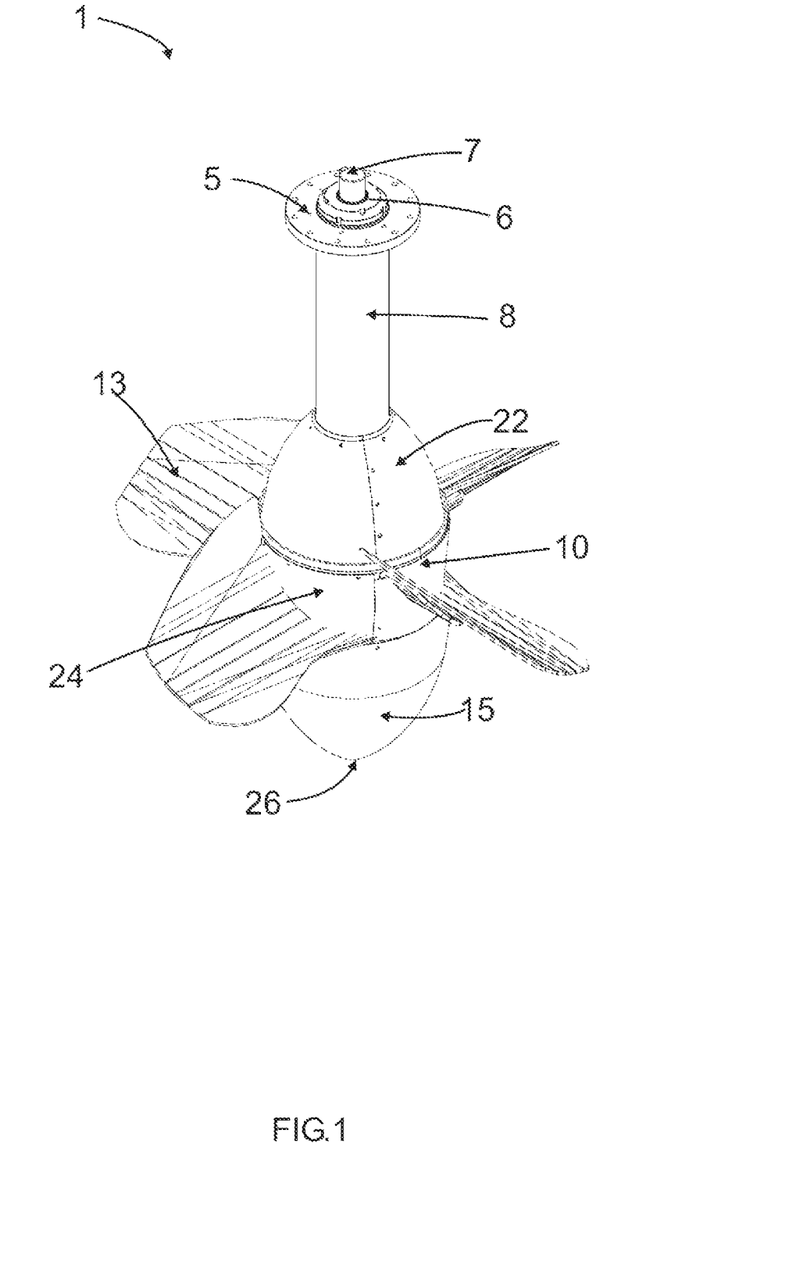
FIG. 1 is a perspective view of the rotor for an exhaust-fan assembly of an agricultural machine as proposed in the present invention.

FIG. 1 is a perspective representation of a preferred embodiment of the rotor 1 for an exhaust-fan assembly 4 of an agricultural machine, according to the teachings of the present invention.

Looking from the outside, one observes that the rotor 1 comprises basically a central shaft, an inlet deflector 15, an outlet deflector 22, a hub 10, a set of blades 13 and a protective tube 8.

The central shaft 7 is fixed to the structure of the agricultural machine by means of a flange 5, this element having, preferably, but not compulsorily, a circular shape.

Further, one can see in FIG. 1 that the flange 5 comprises an adjustable bearing 6 to be mounted within the flange 5 and receive the stresses of an upper portion of the shaft 7. A hydraulic engine (not show) is fixed to the flange 5, which is coupled to the shaft 7 by means of a movement transferring element responsible for moving said shaft 7 and, as a result, of the blades 13 of the rotor 1.

At its lower portion, the central shaft 7 is fixed to a bearing 9, this element comprising a structural configuration similar to the flange 5, but bipartite to facilitate the mounting thereof, the upper part of the bearing 9 being welded to the hub 8 and the lower part that protects the bearing is fixed by means of screws to this upper part.

With regard to the set of blades 13, it comprises preferably a grooved profile with trail and root angles, which facilitate the suction of air and do not cause turbulence or barriers to the air filets sucked.

The grooved configuration of the set of blades 13 forms the leading and trailing edges of the blades 13, providing high efficiency in sucking the air filets according to the movement of the central shaft 7.

Further with reference to FIG. 1, one observes that the rotor 1 proposed in the present invention comprises a protective tube 8 involving a portion of the central shaft 7.

The tube 8 has the function of protecting the central shaft 7 from the impact of impurities present on the harvested cane, since, if this occurs, the functioning of the shaft 7 and, as a result, of the rotor 1 might be impaired.

The protective tube 8 should be preferably manufactured from a resistant material, since this element will join the flange 5, which is fixed to the machine structure, to the bearing 9, which will bear the stresses of the lower part of the shaft 7 and of the movement of the hub 10 with the blades 13. Thus, this tube 8, besides providing protection, also provides support and integrity to the rotor 1. However, one observes that this characteristic is only a preferred feature of the present invention, so that the manufacture from polymeric materials is also acceptable, as long as attention is paid to the due alterations in the fixation of the elements that are connected to the tube 8.

The rotor 1 for an exhaust-fan assembly 4 of an agricultural machine further comprises an inlet deflector 15, a hub 10 and an outlet deflector 22.

Figure 2:
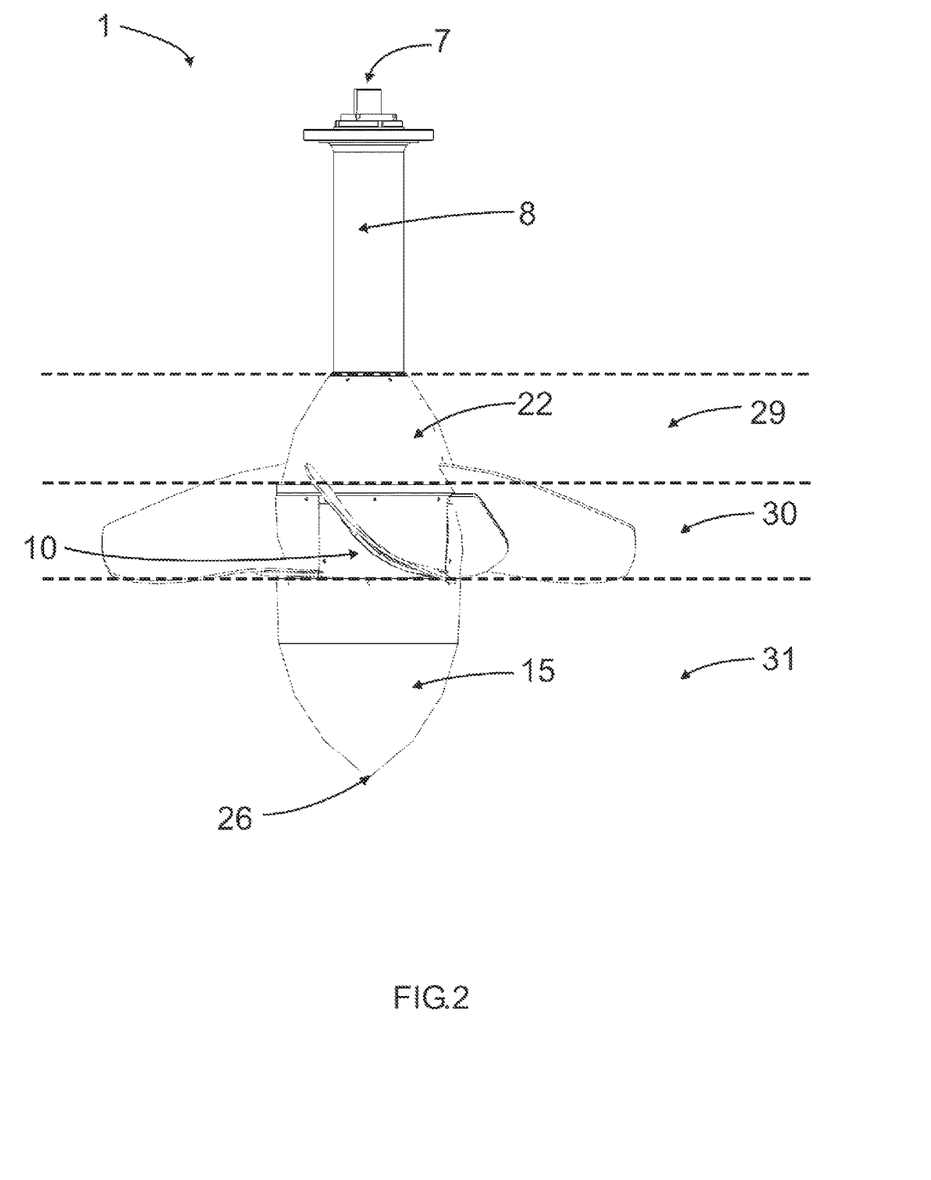
FIG. 2 is a front view of the rotor for an exhaust-fan assembly of an agricultural machine as proposed in the present invention.

Such elements can be better viewed in FIG. 2, which represents a front view of the preferred embodiment of the rotor 1 proposed in the present invention.

One observes that the rotor 1 is provided with a second portion 29, at which the outlet deflector 22 is proposed. The deflector 22 comprises a substantially elliptical profile and is manufactured preferably from a polymeric material. However, manufacturing the outlet deflector 22 from a metallic or plastic material is also acceptable.

The outlet deflector 22 should be fixed to the protective tube 8, and more specifically from ¼ to ½ of distance from the lower part of this element. For this purpose, conventional fixation elements, such as screws, are preferably used.

Additionally, the deflector 22 should be fixed to or supported by a support ring linked to the bearing 9, which is static, thus keeping the deflector 22 static.

Obviously this characteristic is only a preferred option of the invention, so that in an alternative embodiment the outlet deflector 22 might move together with the shaft 7.

The hub 10 is associated to the shaft 7 and, more precisely, to a lower portion thereof. Additionally, the set of blades 13 of the rotor 1 is fixed to the hub 10. The way to fix the blades 13 to the hub 10 will be better described latter in this specification.

In the preferred embodiment, the hub 10 is involved by protective cover 24 of preferably plastic or metallic material, the cover 24 being responsible for protecting the elements arranged inside the hub 10 from the impurities existing on the harvested cane.

Additionally, the hub 10 is associated to the inlet deflector 15 of the rotor 1, as shown in FIG. 2.

The inlet deflector 15 is arranged at a first portion 31 of the rotor 1. Further, in this preferred embodiment, the deflector 15 is fixed to the hub 10 by means of conventional fixation elements, as for example screws.

Having an elliptical profile, the inlet deflector 15 is further provided with a tapering inlet end 26. Said end 26 is configured as an "attack point", thus enabling uniform flow of the air filets sucked by the set of blades 13. The elliptical profile of the deflector 15 does not cause barriers or turbulence to the displacement of the air, thus being a deflector with anti-vortex effect.

This is an important feature of the proposed rotor 1, since the air flow that moves in the first portion 31 is a "dirty" air, that is, it is full of mineral and vegetable impurities. Thus, the occurrence of barriers or turbulence in this region will certainly impair the efficiency of the exhaust-fan assembly 4.

As to the material of the inlet deflector 15, this is preferably a plastic material, but the use of metallic deflectors is also an acceptable proposal.

Regardless of the material used, the elliptical profile of the inlet deflector 15 and the configuration of the tapering inlet end 26 are essential characteristics of the present invention, which should be kept with a view to enable efficient functioning of the rotor 1.

One the main components that integrate the rotor 1 proposed in the present invention have been described, the elements that enable movement of the hub 10 and, as a result, of the set of blades 13 and of the inlet deflector 15 will be described later.

Figure 4:
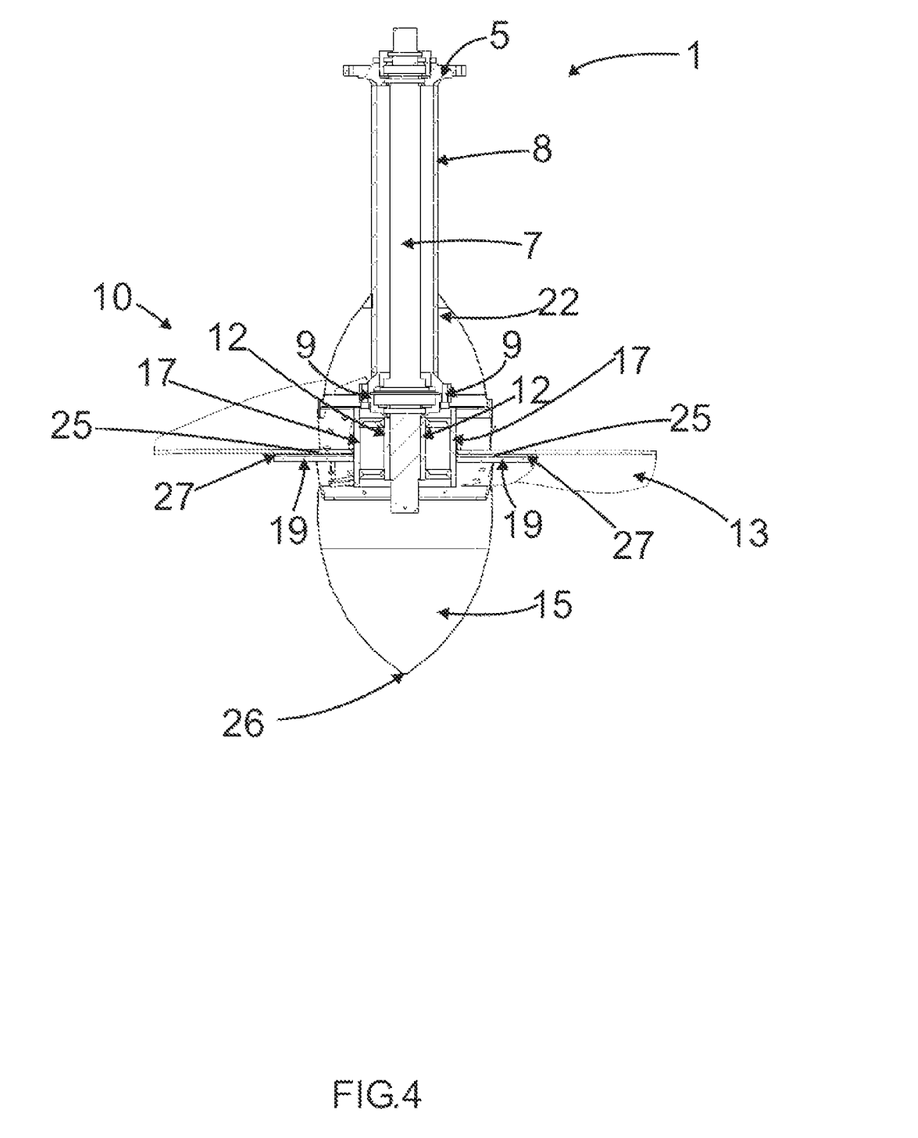
FIG. 4 is a sectional view of the rotor for an exhaust-fan assembly of an agricultural machine as proposed in the present invention.

As an aid, FIG. 4 illustrates a sectional view of this preferred embodiment of the proposed rotor 1.

In this figure, one can see that the hub 10 and, consequently, its protective cover 24 (FIG. 1) are provided with openings 25 for the passage (protrusion) of the set of blades 13.

The association between the set of blades 13 and the hub 10 is made by means of a ring 17 arranged inside the hub 10. Further, a support plate 19 for the blades 13 is fixed to the ring 17, said support plate 19 also protruding through the openings 25 of the hub 10.

Preferably, the fixation of the support plate 19 to the ring 17 is made by a soldering process.

Additionally, the support plate 19 has a profile similar to the profile of a region 16 of the blades 13, said region 16 being configured as a region adjacent to the hub 10. The profile of the region 16 of the set of blades 13 in this preferred embodiment of the present invention can be observed in FIG. 5, where one can see one of the blades of the set of blades 13 and the profile of the region 16, and this region should be arranged adjacently, that is, close to the hub 10.

Figure 5:
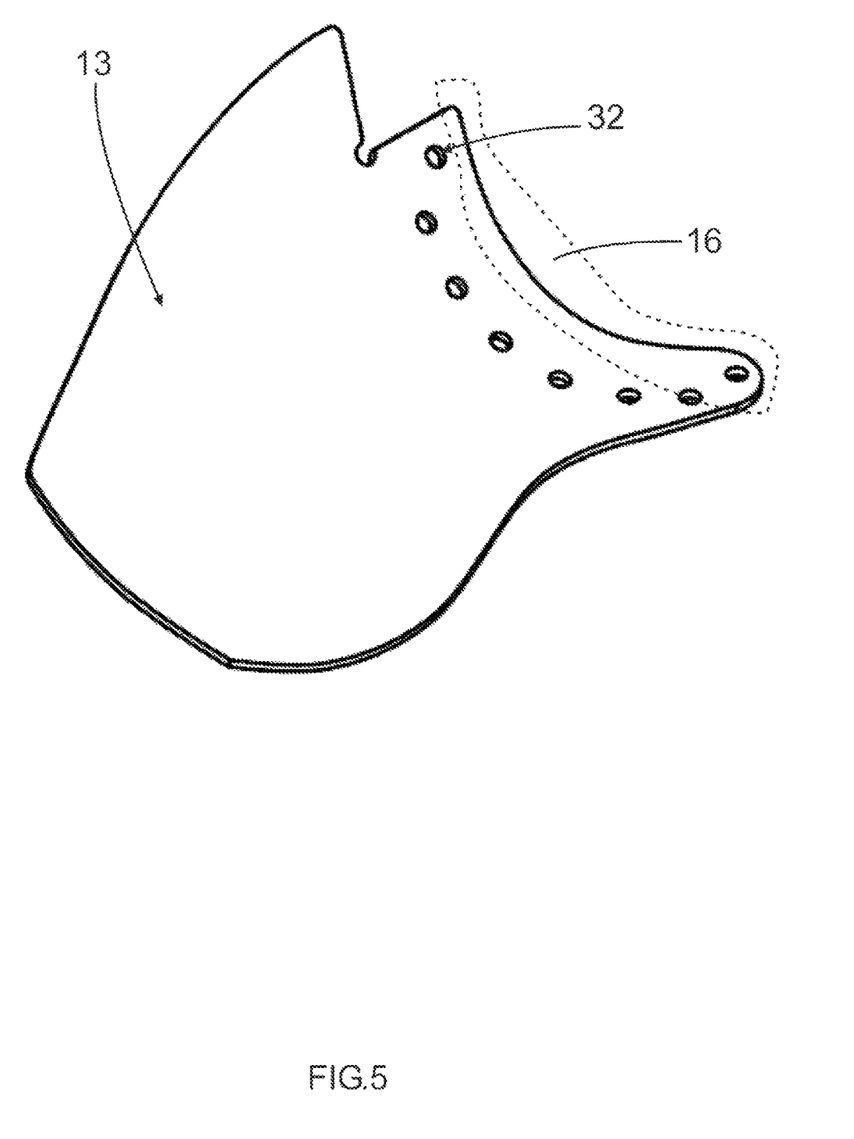
FIG. 5 is a perspective representation of one of the elements used on the rotor proposed in the present invention.

Further, one observes that the blade 13 comprises a plurality of orifices 32 for correct fixation thereof to the support plate 19.

Although the support plate 19 is not shown in FIG. 5, it should have a profile similar to the profile of the region 16, besides comprising orifices (as shown in FIG. 5) for correct fixation of the blade 13.

It should be pointed out that the profile of the region 16, as shown in FIG. 5, is only a preferred profile, so that it should not be considered a limitation of the present invention.

With reference to the sectional representation (FIG. 4) of the rotor 1 proposed in the present invention, one can see that an anti-vibration plate 27 is arranged between the blades of the set of blades 13 and the support plate 19, preferably manufactured from a malleable material, such as rubber or plastic and even a metal the exhibits this characteristic.

The function of the plate 27 is to establish correct balance between the support plate 19 and the blades 13, so as to prevent vibrations during the operation of the rotor 1.

Although the use of the anti-vibration plate 27 is recommendable, this is only a preferred feature of the rotor 1 described herein.

The movement of the set of blades 13 due to the driving of the shaft 7 takes place by movement transfer means 12. In this preferred embodiment, the actuation of the shaft takes place by means of a key. Alternatively, grooved actuation would also be acceptable.

In operation, the hub 10 and the inlet deflector 15 move from the actuation of the shaft 7. As a result, the outlet deflector 22 remains fixed, since, as mentioned, this element is fixed to the protection tube 8 and linked by means of an internal ring to the bearing 9, this element remaining static.

In an alternative configuration, the outlet deflector 22 might also configure a turning element of the rotor 1. In this way, the fixation of the upper part to the protection tube 8 should be dismissed, and the fixation to the lower part made directly to the hub 10.

Further, the set of blades 13 should move counterclockwise, thus sucking the air existing in the exhaust-fan assembly 4.

Figure 6:
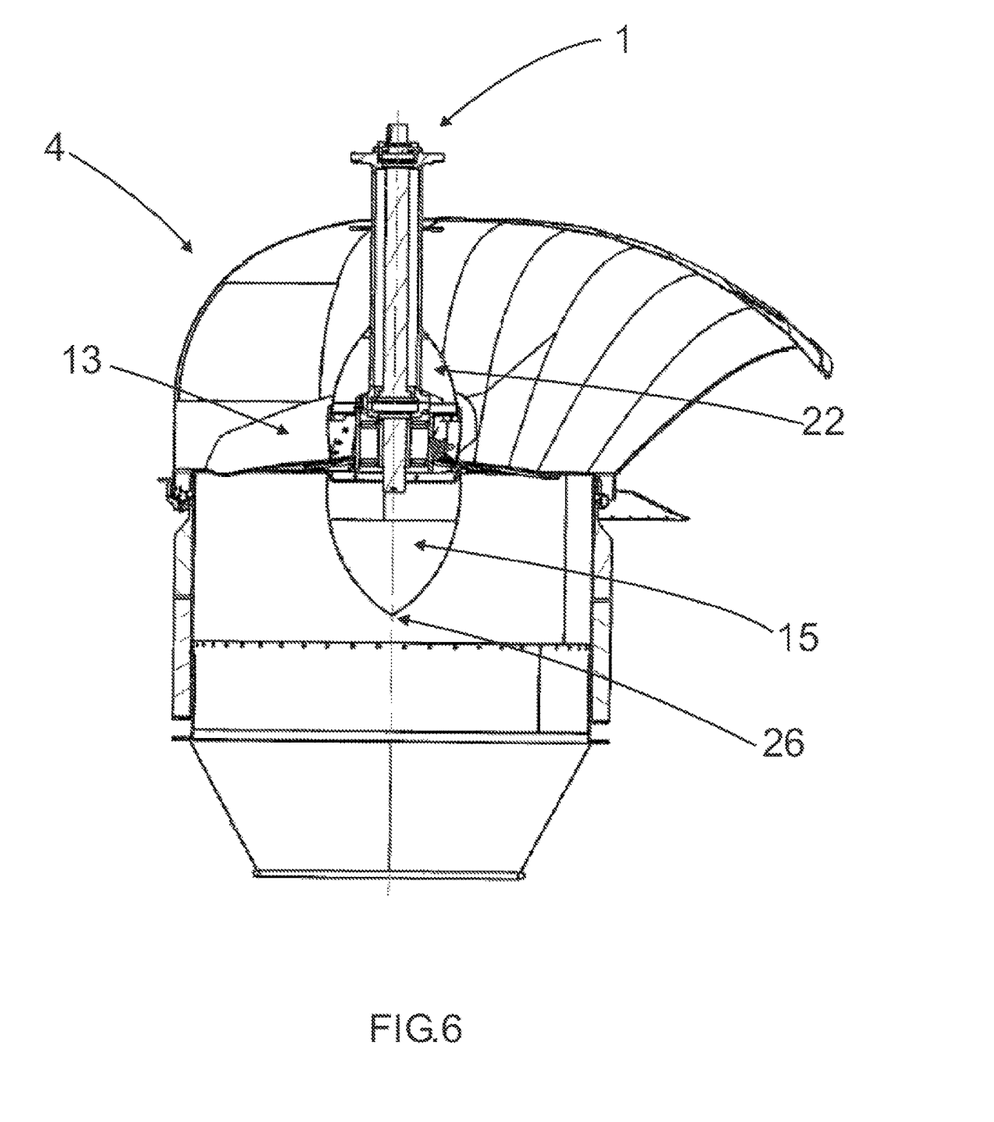
FIG. 6 is a sectional representation of the rotor s proposed in the present invention, used in a generic exhaust-fan assembly.

For a better understanding of the invention, FIG. 6 represents a sectional view of the generic exhaust-fan assembly 4, wherein the rotor 1 can be used. Considering that the focus of the present invention is on the configuration of the rotor 1, a detailed description with regard to the components that integrate the exhaust-fan 4 will not be made.

During the harvesting and, as a result, during the operation of the rotor 1, the impurities present on the harvested cane arranged in the central region of the exhaust-fan 4 are sucked by the set of blades 13 and slide smoothly over the inlet deflector 15 from the tapering inlet end 26.

Later, the air flow passes, either in contact with or close to the protective cover 24 of the hub 10 and is carried by the set of blades 13 from the grooved profile of the latter.

The air containing impurities that already have velocity and precision sufficient to be expelled from the exhaust-fan assembly without coming into contact with the blades 13 slide over the outlet deflector 22 without any blockage or turbulence.

It is important to point out that the exhaust-fan assembly 4 as shown in FIG. 6 represents only an example of utilization of the rotor 1 proposed in the present invention. In this regard, the rotor 1 is apt to be used in conjunction with other exhaust fans than that shown in this figure.

Figure 7:
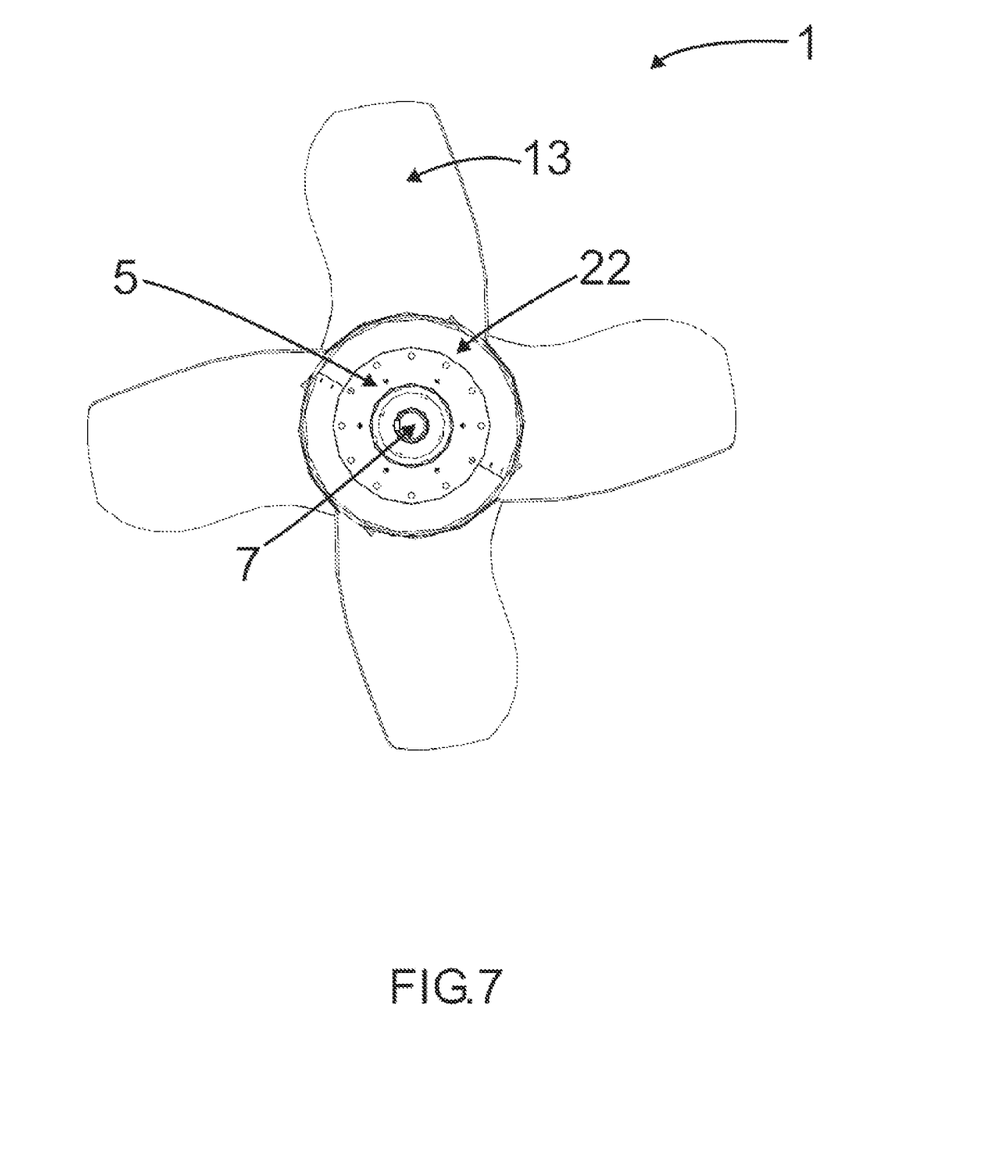
FIG. 7 is a top view of the rotor for an exhaust-fan assembly of an agricultural machine as proposed in the present invention.
Figure 8:
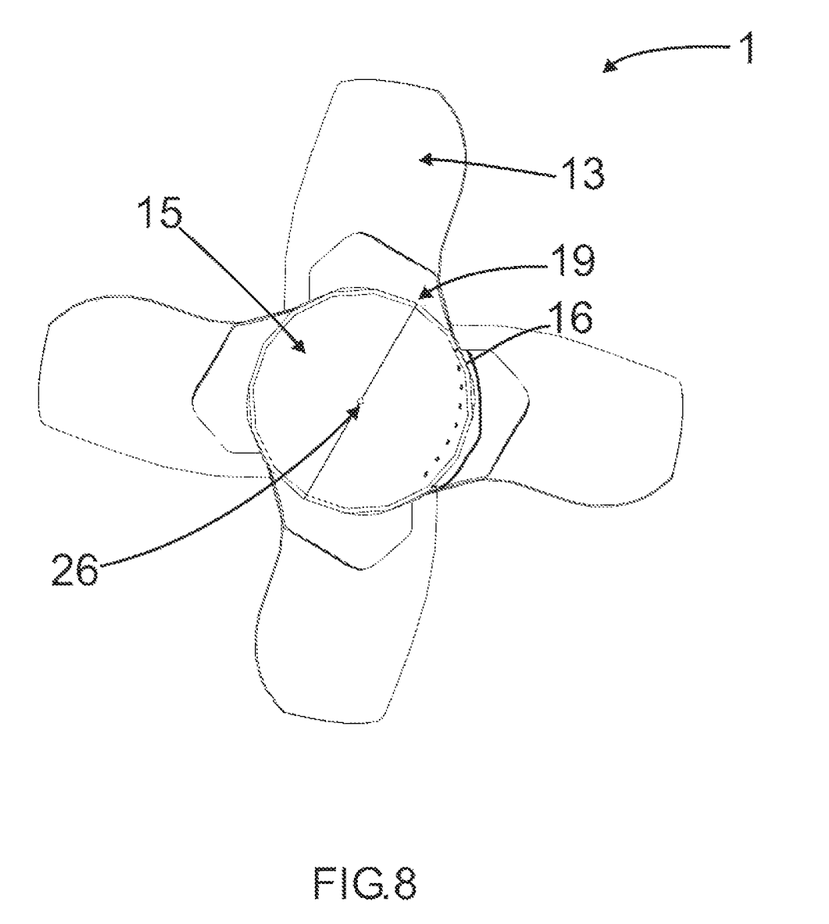
FIG. 8 is a bottom view of the rotor for an exhaust-fan assembly of an agricultural machine as proposed in the present invention.

FIGS. 7 and 8 illustrate, respectively, a top view and a bottom view of the preferred configuration of the rotor 1.

Figure 3:
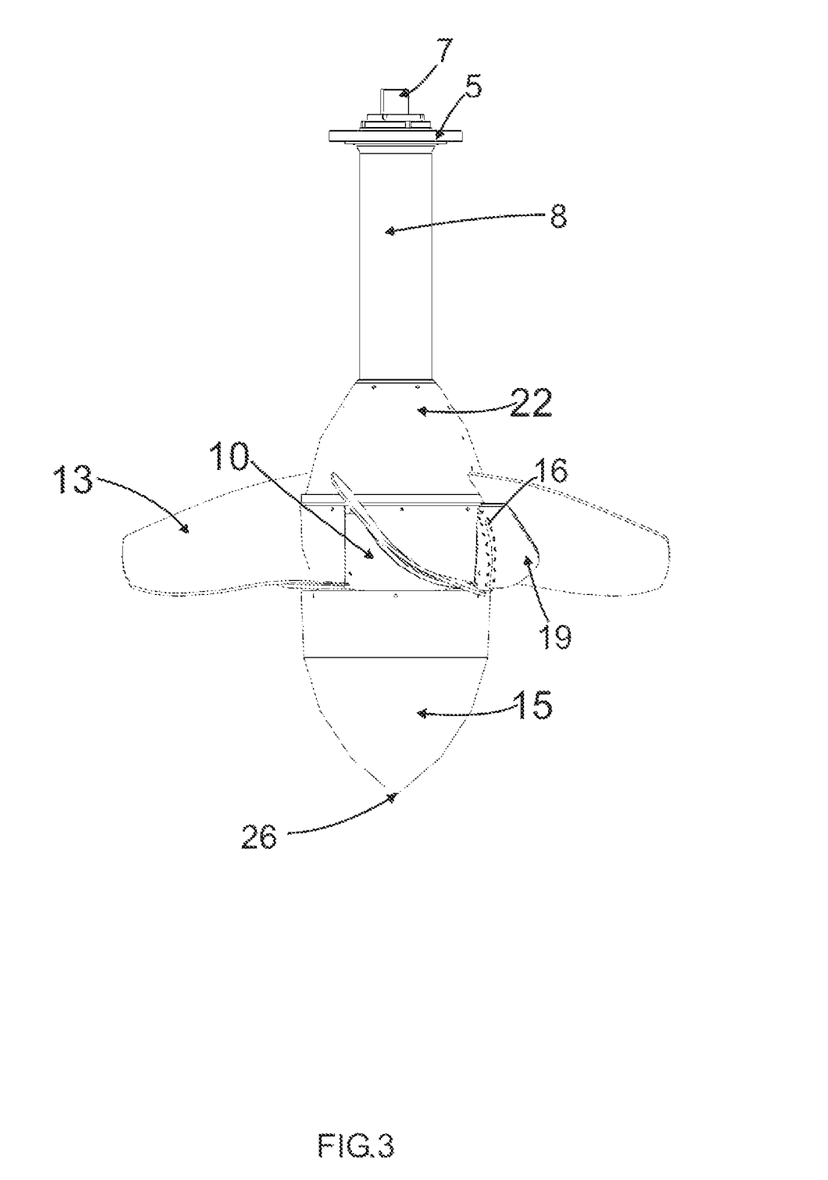
FIG. 3 is an additional front view of the rotor for an exhaust-fan assembly of an agricultural machine as proposed in the present invention.

With regard to FIG. 8, one can observe the characteristic referring to the profile of the support plate 19, the latter being equal to the profile of the region 16 of the set of blades 13. The same characteristic can be observed in FIG. 3.

The rotor 1 proposed herein, by means of the structural configuration of its outlet deflector 22 and inlet deflector 15, provided with the tapering inlet end 26, provides a much more efficient cleaning of the harvested cane if compared with the rotors known from the prior art.

Specifically with regard to the inlet deflector 15 and the tapering end 26,*o* the configuration of such elements prevents the formation of a barrier to the flow of air sucked, as well as the occurrence of turbulence in the exhaust-fan assembly 4.

Further, the elliptical profile of the inlet deflector 15, of the protective cover 24 and of the outlet deflector 22 guarantee a smooth displacement of the air flow and in a region quite close to these components, thus guaranteeing an excellent quality in the cleaning of the cane.

A preferred example of embodiment having been described, one should understand that the scope of the present invention embraces other possible variations, being limited only by the contents of the accompanying claims, which include the possible equivalents.

The invention claimed is:

1. A rotor (1) for an exhaust-fan assembly (4) of an agricultural machine, the rotor (1) comprising:
    a central shaft (7);
    a first portion (31) provided with an inlet deflector (15) of substantially elliptical profile, defining a tapering inlet end (26);
    a second portion (29) provided with an outlet deflector (22) of substantially elliptical profile; and
    a set of blades (13),
    wherein:
        the first and second portions (31, 29) are associated to the central shaft (7);
        the set of blades (13) is associated to a turnable hub (10), the hub (10) being associated to a portion of the central shaft (7); and
        each blade within the set of blades (13) is associated to the hub (10) by means of a ring (17) inside the hub (10) and a support plate (19), the support plate (19) being fixed to the ring (17) and having a profile that is substantially similar to the profile of a region (16) of the blades, the region (16) being adjacent to the hub (10).

2. The rotor according to claim 1, further comprising a third portion (30) arranged between the first portion (31) and the second portion (29), the third portion (30) being provided with the turnable hub (10), the turnable hub (10) being associated to the portion of the shaft (7) by means of a movement transfer system (12).

3. The rotor according to claim 1, wherein the set of blades (13) protrude from a side surface of the turntable hub (10).

4. The rotor according to claim 1, further comprising a protective cover (24) of the turntable hub (10), the protective cover (24) being provided with openings (25) for passage of the blades (13) and support plates (19).

5. The rotor according to claim 4, further comprising an anti-vibration plate (27) arranged between each blade of the set of blades (13) and the support plate (19).

6. The rotor according to claim 1, wherein the outlet deflector (22) is fixed and the inlet deflector (15) is turnable.

7. The rotor according to claim 1, wherein a portion of the central shaft (7) is encompassed by a protective tube (8), the outlet deflector (22) being associated to the protective tube (8).

* * * * *